(12) United States Patent
Patel et al.

(10) Patent No.: US 9,744,695 B2
(45) Date of Patent: Aug. 29, 2017

(54) METHOD OF MANUFACTURING EMBEDDED WATER SOLUBLE FILM CARRIER

(75) Inventors: Shilpan Pravinchandra Patel, Mumbai (IN); Atikullah Hussainmiya Saiyad, Gujurat (IN)

(73) Assignee: Arrow Greentech Limited, Guru Hargovindji Marg, Chakala, Andheri (E), Mumbai, Maharashtra (IN)

(*) Notice: Subject to any disclaimer, the term of this patent is extended or adjusted under 35 U.S.C. 154(b) by 0 days.

(21) Appl. No.: 12/905,035

(22) Filed: Oct. 14, 2010

(65) Prior Publication Data
US 2011/0039985 A1 Feb. 17, 2011

Related U.S. Application Data

(62) Division of application No. 10/491,951, filed as application No. PCT/IN02/00202 on Oct. 7, 2002, now abandoned.

(30) Foreign Application Priority Data

Oct. 9, 2001 (IN) .......................... 443/MUM/2001

(51) Int. Cl.
| B29C 39/14 | (2006.01) |
|---|---|
| B29C 39/20 | (2006.01) |
| B29C 41/24 | (2006.01) |
| C08J 5/18 | (2006.01) |

(Continued)

(52) U.S. Cl.
CPC ............ *B29C 39/14* (2013.01); *B29C 39/203* (2013.01); *B29C 41/24* (2013.01); *C08J 5/18* (2013.01);
(Continued)

(58) Field of Classification Search
CPC ....................................................... B29C 41/28
See application file for complete search history.

(56) References Cited

U.S. PATENT DOCUMENTS 2,421,073 A * 5/1947 Kratz ............................ 425/218
2,436,433 A 2/1948 Jebens
(Continued)

FOREIGN PATENT DOCUMENTS

| EP | 0347220 A1 | 12/1989 |
| EP | 0716144 A2 | 6/1996 |

(Continued)

OTHER PUBLICATIONS

Kirk-Othmer, Encyclopedia of Chemical Technology, Fourth Edition, vol. 10, Explosives and Propellants to Flame Retardants for Textiles, pp. 761-787 (1993).

*Primary Examiner* — Benjamin Schiffman
(74) *Attorney, Agent, or Firm* — Polster, Lieder, Woodruff & Lucchesi, LC (57) ABSTRACT

This invention relates to a water-soluble film (WSF) system with embedded/entrapped water-soluble films (WSF). More particularly, the invention relates to a WSF system with actives embedded/entrapped therein such as to provide precise and desired release of actives there from and its method of manufacturing for diverse applications, in which a variety of substances such as detergents, enzymes, softeners, perfumes, pesticides, fungicides, active ingredients, dyes, pigments, hazardous chemicals, active agents for cleaning laundry, dishes, floorings, walls, furniture, fluffs, pulp, etc., and the like can be so embedded/entrapped for such purpose. The invention further discloses novel online and offline process for the manufacture of such multi-layered WSF with or without liners and of desired shapes to selectively entrap interacting/non-interacting materials and their combinations. The process also provides options for the use of a wide range of raw materials, liners such as paper, film, foil, fabric, etc.

31 Claims, 4 Drawing Sheets

(51) Int. Cl.
*C11D 1/722* (2006.01)
*C11D 3/37* (2006.01)
*C11D 17/04* (2006.01)
*C11D 3/386* (2006.01)
*B29K 33/20* (2006.01)
*B29C 41/44* (2006.01)
*B29K 33/00* (2006.01)
*B29C 41/36* (2006.01)
*B29K 29/00* (2006.01)
*B29K 71/00* (2006.01)
*B29K 1/00* (2006.01)

(52) U.S. Cl.
CPC .............. *C11D 1/722* (2013.01); *C11D 3/37* (2013.01); *C11D 3/38681* (2013.01); *C11D 17/042* (2013.01); *B29C 41/36* (2013.01); *B29C 41/44* (2013.01); *B29K 2001/00* (2013.01); *B29K 2003/00* (2013.01); *B29K 2005/00* (2013.01); *B29K 2029/04* (2013.01); *B29K 2033/08* (2013.01); *B29K 2033/20* (2013.01); *B29K 2071/02* (2013.01); *B29K 2089/00* (2013.01); *B29K 2093/00* (2013.01); *B29K 2995/0062* (2013.01); *Y10T 156/10* (2015.01); *Y10T 428/251* (2015.01)

(56) References Cited

U.S. PATENT DOCUMENTS

| | | | |
|---|---|---|---|
| 3,725,174 A * | 4/1973 | Gaylord | 156/305 |
| 3,762,454 A | 10/1973 | Wilkins, Jr. | |
| 4,115,292 A | 9/1978 | Richardson et al. | |
| 4,128,445 A | 12/1978 | Sturzenegger et al. | |
| 4,176,079 A | 11/1979 | Guerry et al. | |
| 4,416,791 A | 11/1983 | Haq | |
| 4,481,326 A | 11/1984 | Sonenstein | |
| 4,532,963 A | 8/1985 | Bastion et al. | |
| 4,562,020 A * | 12/1985 | Hijiya et al. | 264/39 |
| 4,797,221 A | 1/1989 | Gueldenzopf | |
| 4,801,636 A | 1/1989 | Smith et al. | |
| 4,854,995 A * | 8/1989 | Kasper et al. | 156/243 |
| 4,883,716 A * | 11/1989 | Effenberger et al. | 428/421 |
| 5,308,597 A * | 5/1994 | Ledoux | B01D 53/945 423/440 |
| 5,316,688 A | 5/1994 | Gladfelter et al. | |
| 5,405,314 A | 4/1995 | Ohta et al. | |
| 6,375,963 B1 | 4/2002 | Repka et al. | |
| 6,378,274 B1 | 4/2002 | Harbour | |
| 6,824,829 B2 * | 11/2004 | Berry et al. | 427/372.2 |
| 2001/0038160 A1 * | 11/2001 | Peter et al. | 264/163 |
| 2002/0010123 A1 | 1/2002 | Schmiedel et al. | |

FOREIGN PATENT DOCUMENTS

| | | |
|---|---|---|
| GB | 2244258 A | 11/1991 |
| JP | 6115829 | 1/1986 |
| JP | 6272609 | 4/1987 |
| JP | 64-029438 | 1/1989 |
| JP | 5-285969 | 11/1993 |
| JP | 2001081668 A | 3/2001 |
| WO | 9220774 | 11/1992 |
| WO | 0140420 A2 | 6/2001 |

* cited by examiner

Vertical Method

Perforated Sheets or Rolls

Cut Sheet

Fanfold

METHOD OF MANUFACTURING EMBEDDED WATER SOLUBLE FILM CARRIER

This application is a divisional application of U.S. patent application Ser. No. 10/491,951 filed on Apr. 7, 2004 as a national stage national stage application of International Application No. PCT/IN02/00202 filed on Oct. 7, 2002 which claims the benefit of earlier filed Indian Patent Application No. 443/MUM/2001 filed on Oct. 9, 2001.

FIELD OF INVENTION

This invention relates to a water soluble film (WSF) system with embedded/entrapped water-soluble films (WSF) and a process of manufacturing the same. More particularly, the invention relates to a WSF system with actives embedded/entrapped therein such as to provide precise and desired release of actives therefrom and its method of manufacturing for diverse applications, in which a variety of substances such as detergents, enzymes, softeners, perfumes, pesticides, fungicides, active ingredients, dyes, pigments, hazardous chemicals, active agents for cleaning laundry, dishes, floorings, walls, furniture, etc., and the like can be so embedded/entrapped for such purpose.

BACKGROUND ART

In various processes/operations and in day-to-day life, a number of substances including hazardous or non-hazardous chemicals are required to be delivered in the precisely measured doses.

Attempts by the packaging industry has been to develop approaches to evolve accurate delivery systems for active materials especially those that are expensive or are environmentally sensitive or have possibilities of reacting with other ingredients in formulations. There have been several attempts in the past to either encase or laminate or package different materials in water-soluble films (WSF).

The objective of delivering precise quantities of products like detergents has been addressed by the industry for example by packaging detergents in "soluble" and "non-soluble" sachets in dosages ranging from 20 gms/sachet to 50 gms/sachet. In case of non-soluble sachets the detergents tend to adhere to statically charged packaging material surface thereby inhibiting their total transfer to the point of application. Similar problems of particles adhering to statically charged surface are faced when small and precise quantities of pesticides actives are to be packed in non soluble sachets. In the case of soluble sachets problem arising out of chemical reaction of the ingredients to the film cause serious problems in its smooth applications. Similarly in the case of pesticide packaging the active ingredients in the package varies from about 2% to about 30% based on the formulation.

U.S. Pat. No. 4,416,791 discloses a packaging film comprising a base film of at least partially water-soluble plastics material carrying on one surface only a protective layer, in particulate form, of an inert plastics material having a contact angle to water of at least 80.degree, the said layer being effective to protect the base film surface from attack by aqueous media. Such a packaging film has the advantages that, on its unprotected side, it can be dissolved away, or partly dissolved and partly dispersed, by water, whereas on the side carrying the protective layer it is protected from attack by aqueous systems and other aggressive media. It is essential that the inert protective layer be in the form of substantially un-coalesced discrete particles attached firmly to the base film but only loosely or not at all to each other, so that if the base film is dissolved away the protective layer has little or no integrity and is rapidly dispersed. Further it provides a package comprised of the packaging film defined above, having the protective layer on its internal surface(s), so that the layer protects the package from attack by any water present inside the package. It is claimed that such a product can be used to package liquid or solid detergent useful for dosing into domestic or commercial washing machines.

In one of the methods described in the patent a cold-water-soluble polyvinyl alcohol/polyvinyl acetate film having a thickness of 0.0038 cm was heated to a temperature just above its glass transition temperature to render it slightly tacky. Polytetrafluoroethylene powder is sprinkled onto the upper surface of the heated film. The film is then passed between rollers heated and then allowed to cool.

The limitation of U.S. Pat. No. 4,416,791 is that it requires a pre formed WSF substrate and the extent of coating of the Polytetrafluoroethylene powder would be restricted to the surface of the WSF. By this process it would not be possible to control the depth to which the Polytetrafluoroethylene powder can be embedded.

The end use of this invention would be limited to the water repelancy and the release properties of Polytetrafluoroethylene powder on the surface of the pre formed WSF.

U.S. Pat. No. 4,176,079 discloses an invention for dispersing an enzyme into water soluble resin and forming the resin by casting or extruding into a sheet. The sheet is then dried, if necessary, and, if required, cut into "ribbons" for incorporation into the detergent product. The ribbons of enzyme-dispersed resin may be admixed with a detergent composition in granular, viscous liquid, paste or gel form. The resulting mixture may be used directly in the washing process, particularly in an automatic dishwasher, or it may be incorporated within a water-soluble packet, for easy and convenient dispensing. In this case the water soluble resin is being used as a means to bind the enzyme to its matrix. This method of preparing the ribbons also suffers from the shortcoming that two or more reacting substances cannot be dispersed in the same film as they would interact with each other and degrade.

U.S. Pat. No. 6,378,274 discloses a process for producing a thermoformed package of the type comprising the steps of placing a first sheet of formable film over a forming die having a cavity, moulding the film into the cavity thereby forming a recess in the film, placing a composition in the thus formed recess, and sealing a second sheet of film across the recess to close the package. In particular, the prior art relates to such a process for producing a water-soluble package containing a detergent composition. The disclosure is restricted thermo formed packages formed out of a combination of soluble and insoluble films. It also needs pre formed films to be operated on offline equipment for packaging applications thereby making the process of incorporating the materials within the films very complex and requiring expensive equipment.

Patent No. EP 0493553 relates to a containerization system and to containers which are particularly suitable for storing, packaging and transporting toxic or hazardous products, such as agricultural chemicals. The containerization system comprises the chemical in the form of a gel, which is contained within a water soluble or water-dispersible bag. This EP '553 has limitations as it is restricted to toxic products that can be converted into gels and then packaging of gel into a WSF bag.

Patent No. EP 0347220B1 relates to a package comprising e.g. a liquid chemical or a chemical dissolved or dispersed in an organic liquid contained in an envelope of water-soluble or water dispersible material and having a water-soluble or water dispersible seal. The patent also provides a process for the preparation of a package according to the invention which comprises heat sealing the envelope material to obtain a water dispersible or, preferably, a water soluble heat seal. This prior art specifically discusses packaging of pesticides by means of an efficient heat seal system into a container.

Patent GB 2244258B relates to a package comprising hazardous chemical dissolved or dispersed in a liquid or gel which is contained in an envelope of water-soluble or water-dispersable material. The patent seeks to provide a new container system for agrochemicals which is safe to handle. This patent also provides a package which comprises a hazardous chemical dissolved or dispersed in a liquid or gel contained in a water-soluble or water-dispersible laminated film. There is also discussed the delivery of toxic and hazardous materials by means of plain and laminated soluble sachets.

It would be evident from the above state of the art that none of the prior art teach or provide for delivery of the encased, laminated or packaged material in precise quantities. It is therefore the long-standing need of industry to develop efficient and cost effective stable embedded WSFs for controlled dosing in diverse applications and especially to embed a wide variety of substances avoiding interaction with each other within films. Further the need for carriers that can selectively carry combination of materials with dissimilar properties such as miscible/in-miscible, hydrophobic/hydrophilic ingredients continues to elude the industry.

OBJECT OF THE INVENTION

The main object of the present invention is to provide stable water soluble film system having embedded/entrapped actives and to a process for the manufacture of such stable water soluble films for diverse applications, in which a variety of substances such as detergents, enzymes, softeners, perfumes, pesticides, fungicides, pigments, hazardous chemicals, active agents for cleaning laundry, dishes, floorings, walls, furniture etc., and the like are embedded/entrapped singly or in combination for delivering them in precise and desired dosages.

Another object of the present invention is to provide an offline process for the manufacture of stable water soluble films for diverse applications, in which a variety of substances such as detergents, enzymes, softeners, perfumes, pesticides, fungicides, pigments, hazardous chemicals, active agents for cleaning laundry, dishes, floorings, walls, furniture etc., and the like are embedded/entrapped singly or in combination for delivering them in precise and desired dosages.

Another object of the invention is to provide a process of entrapping absorbent materials such as fluff, pulp and the like within WSFs.

It is yet another object of the invention to disperse diverse non-water-soluble materials on the surface and within WSFs.

Yet another object of the present invention is to provide a process for manufacture of multi-layered WSF to selectively entrap interacting/non-interacting materials.

Yet another object of the present invention is to provide a process for manufacture of multi-layered WSF to selectively entrap combination of materials with similar and/or dissimilar properties.

It is yet another object of the invention to provide a process of manufacturing of WSFs with materials embedded in selective areas of the WSFs in desired shapes.

It is yet another object of the invention to provide WSFs for diverse applications, in which a variety of substances such as detergents, enzymes, softeners, perfumes, pesticides, fungicides, pigments, hazardous chemicals, active agents for cleaning laundry, dishes, floorings, walls, furniture etc., and the like are embedded for delivering them in precise and desired quantities.

It is yet another object of the invention to provide a process for the manufacture of WSFs exploiting the various embodiments of the invention using a wide range of raw materials including polyvinyl alcohol copolymer ionomers, polyvinyl alcohol homopolymer, non-ionomeric poly vinyl alcohol polymer, polymethacrylate, polyvinyl alcohol, polyacrylamide, polymethacrylamide, polyacrylic acid, polymethacrylic acid, polyethyleneglycol, polyvinylpyrrolidone, proteinaceous binders such as gelatin modified gelatins such as phthaloyl gelatin, polysaccharides, such as starch, gum arabic and dextrin and water-soluble cellulose derivatives.

It is yet another object of the invention to provide a process for the manufacture of WSFs with the options to use a range of liners such as paper, film, foil or fabric, preferably of film, more preferably of polyester film. The film liners may be plain, metalised, embossed, gloss or matte depending upon the desired end product parameters. Paper liner can be plain, embossed, gloss, matte, extrusion coated laminated or release coated. Fabrics made of cotton or synthetic yarns, solution coated, plain, embossed, gloss, matte, extrusion coated or laminated may be used as liner dependant dependent upon the desired end product properties. Foils made of steel, aluminum, copper or mixture thereof, more preferably aluminum foil, plain, embossed, gloss, matte, extrusion coated laminated or release coated. A liner may be made of a combination of any or all of the above materials. A liner may be used for single use or may be used for multiple uses.

SUMMARY OF THE INVENTION

Thus according to one aspect of the present invention there is provided a WSF system comprising at least one active material embedded and/or entrapped at selected concentrations and depths/dispositions therein such that said active material thus embedded/entrapped could be delivered at precisely regulated dosages.

According to another aspect the present invention is directed to a process for the manufacture of embedded/entrapped water-soluble film (WSF) system comprising:
 i) providing the formulation of said WSF with or without liner material
 ii) subjecting the said WSF to casting wherein at least one desired active material is embedded/entrapped prior to and/or after the said casting of the WSF.

According to another aspect the present invention is directed to a process for the manufacture of embedded/entrapped water-soluble film (WSF) system using a casting liner or a conveyor comprising:
 i) mixing of the formulation of WSF;
 ii) casting of at least one WSF at least one casting head;

iii) metering of the cast film at the respective casting head, wherein said active material to be embedded is added with the WSF prior to casting and/or at least during casting;
iv) smoothening of the at least one film thus formed; and
v) drying of the WSF.

According to another aspect the present invention is directed to a process comprising the steps of dispersing of material to be embedded on said cast WSF prior to the step of smoothing at anyone or more of said casting heads for casting of the films. The WSF films thus embedded are wound and retained.

According to another aspect the present invention is directed to a process comprising:
i) unwinding a pre-formed WSF from an unwinder and guiding it through guide rolls to meet the WSF with said embedded materials for further entrapping of the materials embedded; followed by
ii) guiding the multilayered WSF of step (i) through hot/chill device for rewinding or splitting.

According to another aspect the present invention is directed to using a casting conveyor without liner comprising:
i) casting of WSF with embedded material the temperature range maintained from 10° C. to 95° C., preferably 13° C. to 90° C., more preferably 15° C. to 85° C.;
ii) metering of the cast film at casting head;
iii) smoothening of the film with the embedded materials at the primary station;
iv) drying of the WSF from step (i), the temperature range in the dryers ranging from 50° C. to 250° C., preferably from 60° C. to 200° C., more preferably from 55° C. to 170° C.;
v) rewinding of the WSF.

According to yet another aspect the present invention is directed to a process using a Casting WSF on a liner comprising:
i) providing a liner for the formation of WSF with or without treating/coating;
ii) casting of WSF with embedded material, the temperature range of the batch solution maintained from 10° C. to 95° C., preferably from 13° C. to 90° C., more preferably from 15° C. to 85° C.;
iii) metering of the cast film at casting head;
iv) smoothening of the film with the embedded material at primary station, the percentage of solid content maintained in the range of 3% to 85%, preferably in the range of 4% to 70%, more preferably in the range of 5% to 65%;
v) drying of the WSF, the temperature range in the dryers maintained from 50° C. to 250° C., preferably from 60° C. to 200° C., more preferably 55° C. to 170° C.;
vi) casting of WSF with or without the material to be embedded at secondary/tertiary subsequent casting head(s);
vii) drying of the WSF, the temperature range in the second dryers maintained from 50° C. to 200° C., preferably 60° C. to 160° C., more preferably 55° C. to 140° C.;
viii) guiding the multi-layered WSF through hot/chill device for rewinding or splitting.

According to a further aspect the present invention is directed to a process using a spraying method comprising:
i) unwinding of the liner for the formation of WSF and/or a conveyor is provided.
ii) optional coating of the liner via a primer coating station;
iii) casting of WSF with material to be embedded at a primary casting head, the temperature range of the batch solution maintained from 10° C. to 95° C., preferably 13° C. to 90° C., more preferably 15° C. to 85° C.;
iv) metering of the cast film at a casting head;
v) executing a controlled dosing by spraying of pre-measured material to be embedded by primary sprayer;
vi) smoothening of the film with the embedded material at a primary station;
vii) drying of the WSF at a dryer, the temperature range in the dryers maintained in the range of 50° C. to 250° C., preferably from 60° C. to 200° C., more preferably 55° C. to 170° C.;
viii) casting of WSF with or without the material to be embedded at secondary/tertiary subsequent casting head(s);
ix) drying of the WSF, the temperature range in the second dryer maintained 50° C. to 200° C., preferably 60° C. to 160° C., more preferably 55° C. to 140° C.;
x) guiding the multilayered WSF through hot/chill cylinder for rewinding or splitting.

According to another aspect the present invention is directed to a process using a Secondary application on partially formed film comprising:
i) unwinding of the liner for the formation of WSF and/or providing a conveyor;
ii) optional coating of the liner via a primer coating station;
iii) casting of WSF with material to be embedded at primary casting head, the temperature range of the batch maintained in the range of 10° C. to 95° C., preferably 13° C. to 90° C., more preferably 15° C. to 85° C.;
iv) metering of the cast film at casting head;
v) smoothening of the film with the embedded material at primary station, drying of the WSF, the temperature range in the dryers maintained in the range of 50° C. to 250° C., preferably from 60° C. to 200° C., more preferably 55° C. to 170° C.;
vi) executing a controlled dosing by spraying of pre-measured material to be embedded by secondary disperser;
vii) smoothening of the film with the embedded material at secondary station;
viii) casting of WSF with or without the material to be embedded at secondary/tertiary subsequent casting head(s);
ix) drying of the WSF, the temperature range in the second dryers) maintained in the range of 50° C. to 200° C., preferably 60° C. to 160° C., more preferably 55° C. to 140° C.;
x) guiding the multilayered WSF through hot/chill cylinder for rewinding or splitting. Optionally offline or online splitting between the WSF film and the liner.

According to another aspect the present invention is directed to online entrapment comprising:
i) unwinding of the liner for the formation of WSF and/or providing a conveyor;
ii) optional coating of the liner via a primer coating station;
iii) casting of WSF with material to be embedded at primary casting head the temperature range maintained 10° C. to 95° C., preferably 13° C. to 90° C., more preferably 15° C. to 85° C.;
iv) metering of the cast film at casting head;

v) smoothening of the film with the embedded material at primary station;

vi) drying of the WSF, the temperature range in the dryers maintained in the range of 50° C. to 250° C., preferably from 60° C. to 200° C., more preferably from 55° C. to 170° C.;

vii) casting of WSF with or without the material to be embedded at secondary/tertiary subsequent casting head(s);

viii) drying of the WSF, the temperature range in the second dryers maintained from 50° C. to 200° C., preferably 60° C. to 160° C., more preferably 55° C. to 140° C.;

ix) unwinding of a pre-formed WSF from an unwinder and guiding it through the guide rolls to meet the WSF, with embedded material for entrapping of materials embedded.

Preferably, in the above process of the invention, the materials of the WSF formulation is taken in a batch reactor and mixed intimately to ensure complete dissolution in the desired solvent. As would be evident from the above various possible embodiments of the process can be followed.

In one of the embodiments of this of this invention the materials to be embedded in the WSF are added to the batch solution and mixed thoroughly before feeding it to the casting head for further processing. The materials that can be taken into the batch mixing are selected from those that are water-soluble, sheer insensitive, temperature resistant, like certain agrochemicals, pesticides, insecticides, softners, surfactants, perfumes for detergent and laundry industry, disinfectants, de-odorizing liquids, etc.

In another embodiment of this invention the materials to be embedded in the WSF may optionally be introduced in the process at the primary, secondary, tertiary and subsequent sprayers and or at the second or subsequent casting heads fed from second and/or subsequent batch mixers.

In another embodiment of the present invention the materials to be embedded is dispensed in between incoming cured or uncured WSFs In another embodiment of the present invention the process maybe carried out with the aid of a self-rolling conveyor.

In yet another embodiment of the present invention the process maybe carried out with the aid of a casting liner.

DETAILED DESCRIPTION IN RELATION TO ACCOMPANYING FIGURES

The details of the invention its objects and advantages are explained hereunder in greater details in relation to non-limiting exemplary illustrations given in FIGS. 1-4

Figure 1:
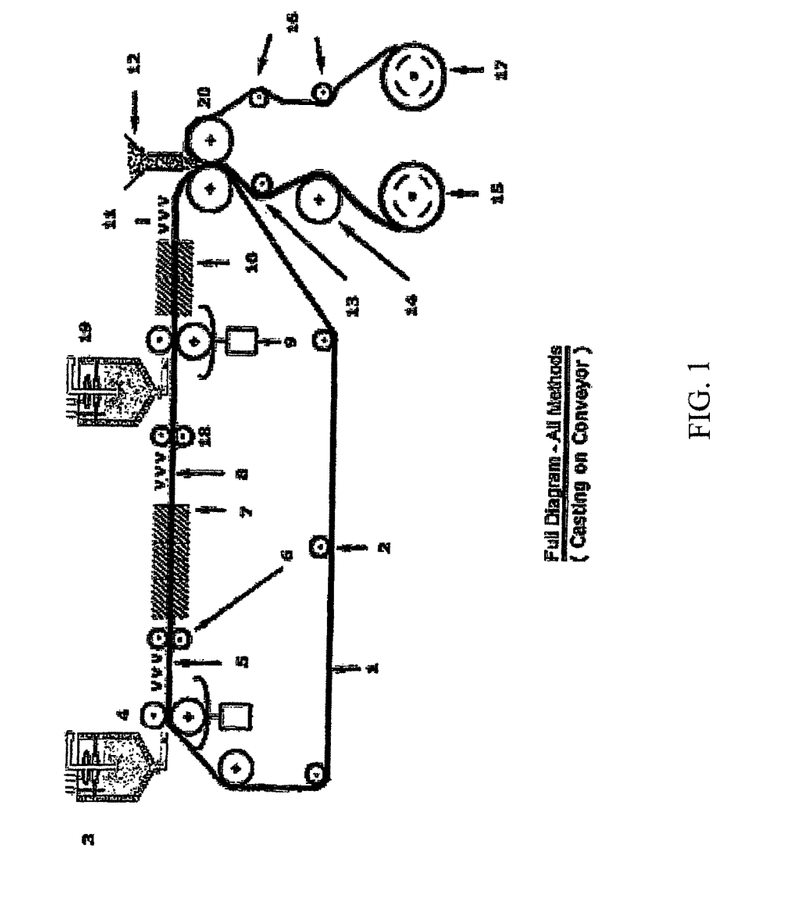
FIG. 1 is a schematic drawing showing a system for casting of a water soluble film on a conveyor.
Figure 2:
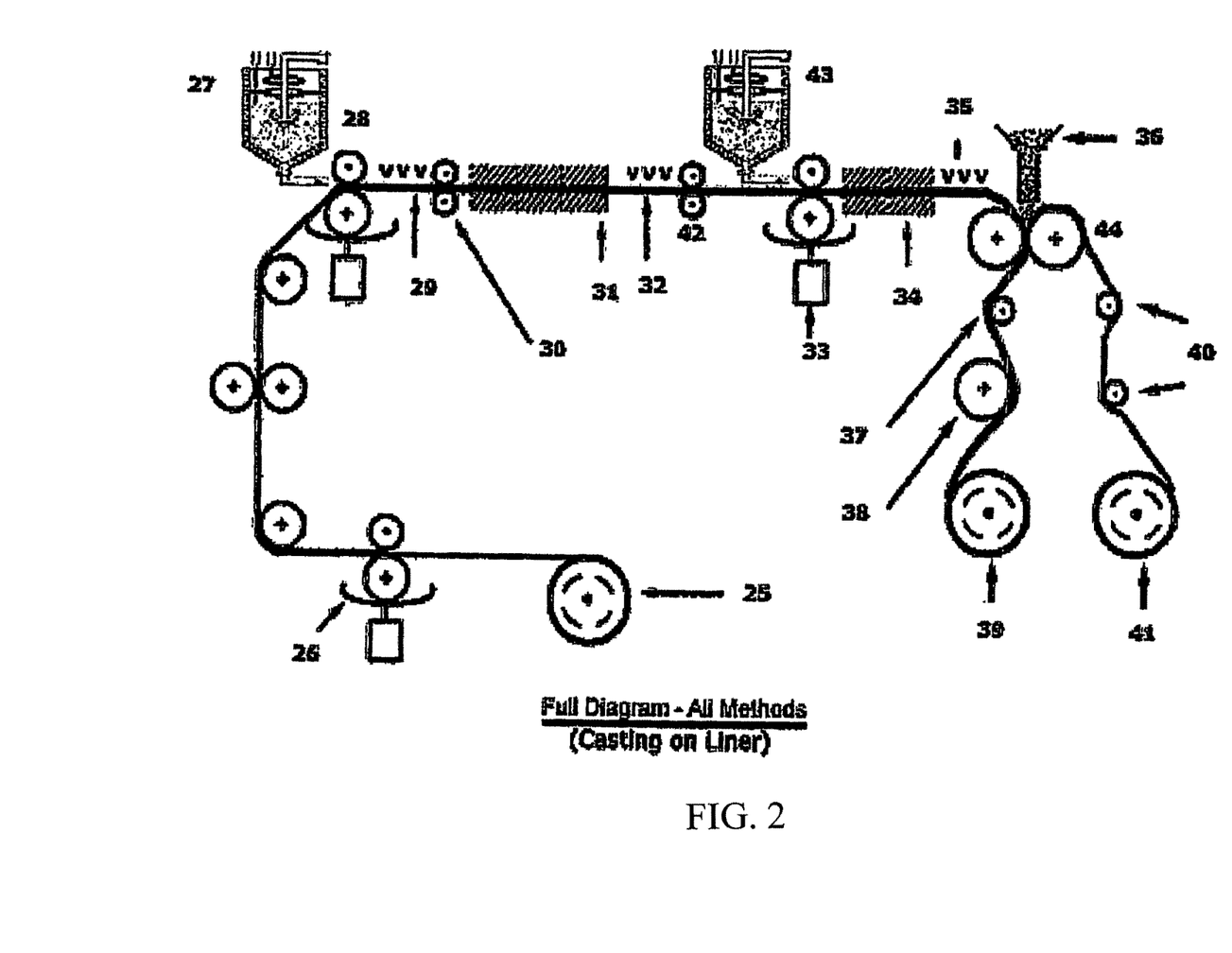
FIG. 2 is a schematic drawing showing a system for casting of a water soluble film on a liner.

The explanation to the part numbers in FIG. 1 is given below:

1 Conveyor; 2 Guide Roll; 3 Batch Mix; 4 Primary Casting Head; 5 Primary Sprayer; 6 Smoothening Rolls; 7 Dryer; 8 Secondary Sprayer; 9 Secondary Casting Head; 10 Dryer; 11 Tertiary Sprayer; 12 Disperser for Entrapment; 13 Guide Roll; 14 Chilling Cylinder; 15 Rewinder; 16 Guide Rolls; 17 Unwinder; 18 Smoothening Rolls; 19 Batch Mix; 20 Nip Roll;

Accordingly as illustrated in FIG. 1 the process comprises of the following steps:

1. Batch Mixing of the formulation of WSF and optionally the material to be embedded;
2. Casting of WSF with or without the material to be embedded at primary casting head;
3. Metering of the cast film at casting head;
4. Optionally dispersing of material to be embedded by primary sprayer;
5. Smoothening of the film with or without the embedded materials at the primary station;
6. Drying of the WSF from step 2;
7. Optional spraying of material to be embedded using a secondary sprayer;
8. Smoothening of the film with or without the embedded materials at the secondary station;
9. Drying of the WSF from step 7;
10. Casting of WSF with or without the material to be embedded at secondary casting head;
11. Optional spraying of material to be embedded by a tertiary disperser;
12. Rewinding of the WSF;
13. Optionally as a post-step 11 step unwind a pre-formed WSF from an unwinder and guiding it through the guide rolls to meet the WSF from step 11 for entrapping of materials to be embedded;
14. Guide the multilayered WSF of step 13 through hot/chill cylinder for rewinding or splitting;

Optionally the steps 1 to 14 may also be carried out on a casting liner (FIG. 1) or a conveyor (FIG. 2).

The invention and the various embodiments are further explained hereunder in relation to the accompanying figures:

Casting Conveyor without Liner [FIG. 1]

This process comprises of the following:

1. Casting of WSF on (1) at (4) with embedded material in the batch mix. The temperature range of the batch solution is in between may vary from around 10° C. to around 95° C., preferably around 13° C. to around 90° C., preferably around 15° C. to around 85° C.
2. Metering of the cast film at casting head.
3. Smoothening of the film with the embedded materials at the primary station (6).
4. Drying of the WSF from step 1 at (7). The temperature range in the dryers may vary from around 50° C. to around 250° C., preferably between around 60° C. to around 200° C., more preferably between around 55° C. to around 170° C. Rewinding of the WSF at (15).

Casting WSF on a Liner (FIG. 2)

The explanation to the part numbers in FIG. 2 is given below:

25 Unwinder of "Carrier Web"; 26 Primer Coating; 27 Batch Mix; 28 Primary Casting Head; 29 Primary Sprayer; 30 Smoothening Roll; 31 Dryer; 32 Secondary Sprayer; 33 Secondary Casting Head; 34 Dryer; 35 Tertiary Sprayer; 36 Disperser for Entrapment; 37 Guide Roll; 38 Chilling Cylinder; 39 Rewinder; 40 Guide Rolls; 41 Unwinder; 42 Smoothening Rollers; 43 Batch Mix; 44 Nip Roll;

This process comprises of the following:

1. Unwinding of the liner at (25) for the formation of WSF which can be optionally treated or untreated and coated or uncoated. Liners can be of paper, film, foil or fabric, preferably of film, more preferably of polyester film. The films can be in the range of 2 microns to 500 microns, preferably in the range of 10 microns-300 microns, more preferably in the range of 12 microns-250 microns. The film liner may be plain, metallised, embossed, gloss, matte, extrusion coated laminated or release coated depending on the desired characteristics of the end product. Paper Liner are also used for production of WSF film. Paper liners that accept temperatures needed for production of WSF, GSM (Grams per sq meter—the standard for measuring weight of paper) may be in the range of around 7 gms to around 500 gms, preferably a range of around 20 gm to around 300 gms, more preferably in the range of around 60 gm to around 180 gms. The paper liner may be plain, embossed, gloss, matte, extrusion coated laminated or release coated depending on the desired characteristics of the end product. Fabrics made of cotton or synthetic yarns, solution coated, plain, embossed, gloss, matte, extrusion coated or laminated may be used as liner based on the desired end product properties.

2. Optional coating of the liner via a primer coating station (26).
3. Casting of WSF on (25) at (28) with embedded material in the batch mix. The temperature range of the batch solution may be around 10° C. to around 95° C., preferably around 13° C. to around 90° C., more preferably around 15° C. to around 85° C.
4. Metering of the cast film at casting head.
5. Smoothening of the film by (30) with the embedded material at primary station.

The percentage of solid content may be in the range of around 3% to around 85%, preferably in the range of around 4% to around 70%, more preferably in the range of around 5% to around 65%

6. Drying of the WSF from step 3 at (31). The temperature range in the dryers may be set from around 50° C. to around 250° C., preferably from around 60° C. to around 200° C., more preferably around 55° C. to around 170° C. The temperature range of the batch solution may vary from around 10° C. to around 95° C., preferably around 13° C. to around 90° C., more preferably around 15° C. to around 85° C.
7. Casting of WSF with or without the material to be embedded at secondary/tertiary subsequent casting head(s) (33).
8. Drying of the WSF from step 7 at (34). The temperature range in the second dryers (34) may be from around 50° C. to around 200° C., preferably around 60° C. to around 160° C., more preferably around 55° C. to around 140° C.
9. The multi-layered WSF of step 8 is guided through hot/chill cylinder (38) for rewinding or splitting at (39).

Spraying Method (FIG. 2)
This process comprises of the following
1. Unwinding of the liner at 25 for the formation of WSF. Optionally a conveyor can be used.
2. Optional coating of the liner via a primer coating station (26).
3. Casting of WSF with material to be embedded at primary casting head (28). The temperature range of the batch solution may vary from around 10° C. to around 95° C., preferably around 13° C. to around 90° C., more preferably around 15° C. to around 85° C.
4. Metering of the cast film at casting head.
5. Spraying of pre-measured material to be embedded by primary sprayer (29).
6. Smoothening of the film with the embedded material at primary station (30).
7. Drying of the WSF from step 5 at dryer (31). The temperature range in the dryers may be set from 50° C. to around 250° C., preferably from around 60° C. to around 200° C., more preferably around 55° C. to around 170° C.
8. Casting of WSF with or without the material to be embedded at secondary/tertiary subsequent casting head(s) (33).
9. Drying of the WSF from step 8 at dryer (34). The temperature range in the second dryer (34) may be from around 50° C. to around 200° C., preferably around 60° C. to around 160° C., more preferably around 55° C. to around 140° C.
10. The multilayered WSF of step 8 is guided through hot/chill cylinder (38) for rewinding or splitting at (39).

Secondary Application on Partially Formed Film [FIG. 2]
This process comprises of the following:
1. Unwinding of the liner at (25) for the formation of WSF. Optionally a conveyor can be used.
2. Optional coating of the liner via a primer coating station (26).
3. Casting of WSF with material to be embedded at primary casting head (28). The temperature range of the batch solution may vary from around 10° C. to around 95° C., preferably around 13° C. to around 90° C., more preferably around 15° C. to around 85° C.
4. Metering of the cast film at casting head.
5. Smoothening of the film with the embedded material at primary station (30).
6. Drying of the WSF from step 5 at dryer (31). The temperature range in the dryers may be set from 50° C. to around 250° C., preferably from around 60° C. to around 200° C., more preferably around 55° C. to around 170° C.
7. Spraying of pre-measured material to be embedded by secondary disperser (32).
8. Smoothening of the film with the embedded material at secondary station (42).
9. Casting of WSF with or without the material to be embedded at secondary/tertiary subsequent casting head(s) (33).
10. Drying of the WSF from step 9 at dryer (34). The temperature range in the second dryers (34) may be from around 50° C. to around 200° C., preferably around 60° C. to around 160° C., more preferably around 55° C. to around 140° C.
11. The multilayered WSF of step 9 is guided through hot/chill cylinder (38) for rewinding or splitting at (39). Optionally offline or online splitting between the WSF film and the liner can be done.

Online Entrapment Method [FIG. 21]
The process comprises of the following:
1. Unwinding of the liner at (25) for the formation of WSF, optionally a conveyor can be used.
2. Optional coating of the liner via a primer coating station (26).
3. Casting of WSF with material to be embedded at primary casting head (28). The temperature range of the batch solution may vary from around 10° C. to around 95° C., preferably around 13° C. to around 90° C., more preferably around 15° C. to around 85° C.
4. Metering of the cast film at casting head.
5. Smoothening of the film with the embedded material at primary station (30).
6. Drying of the WSF from step 5 at dryer (31). The temperature range in the dryers may vary from around 50° C. to around 250° C., preferably from around 60° C. to around 200° C., more preferably from around 55° C. to around 170° C.
7. Casting of WSF with or without the material to be embedded at secondary/tertiary subsequent casting head(s) (33).
8. Drying of the WSF from step 7 at dryer (34). The temperature range in the second dryers (7) may be from around 50° C. to around 200° C., preferably around 60° C. to around 160° C., more preferably around 55° C. to around 140° C.
9. Unwinding of a pre-formed WSF from an unwinder (41) and guiding it through the guide rolls (40) to meet the WSF from step 8 for entrapping of materials to be embedded. Both the liners along with WSF film, which may be semi-cured WSF and the entrapments, may remain in the roll form or sheet form in its original construction, stripping from casting liner can be done immediately or after an self-curing ageing period ranging from around 1 hrs. to around 720 hrs., prior to splitting the liners so as to deliver the final WSF product with entrapped materials.
10. If desired the multi-layered WSF of step 9 may be guided through hot/chill cylinder (38) for rewinding or splitting at (39). Optionally offline or online splitting between the WSF film and the liner can be done The process described above offers various possibilities for the manufacture of WSFs with entrapped materials either on a liner or a conveyor. Some of the product options the may be exercised are as follows:

H/E/H
H/E/C
H/E/H/E/H . . . n times
C/E/C/E/ . . . n times
C/E/C/E/C . . . n times
C/E/C . . . n times
L/UC/E/UH/E . . . n times
L/UH/E/UH/E . . . n times
L/UC/E/UC/E . . . n times
L/UC/E/H/L/E . . . n times
L/UH/E/H/L/E . . . n times
L/UC/E/C/L/E . . . n times
Where
U=Uncured; H=Hot Water Soluble Film; C=Cold Water Soluble Film
E=Embedded Material; L=Liner and the value of "n" is decided based on the application of the final multilayered embedded WSF.

Figure 3:
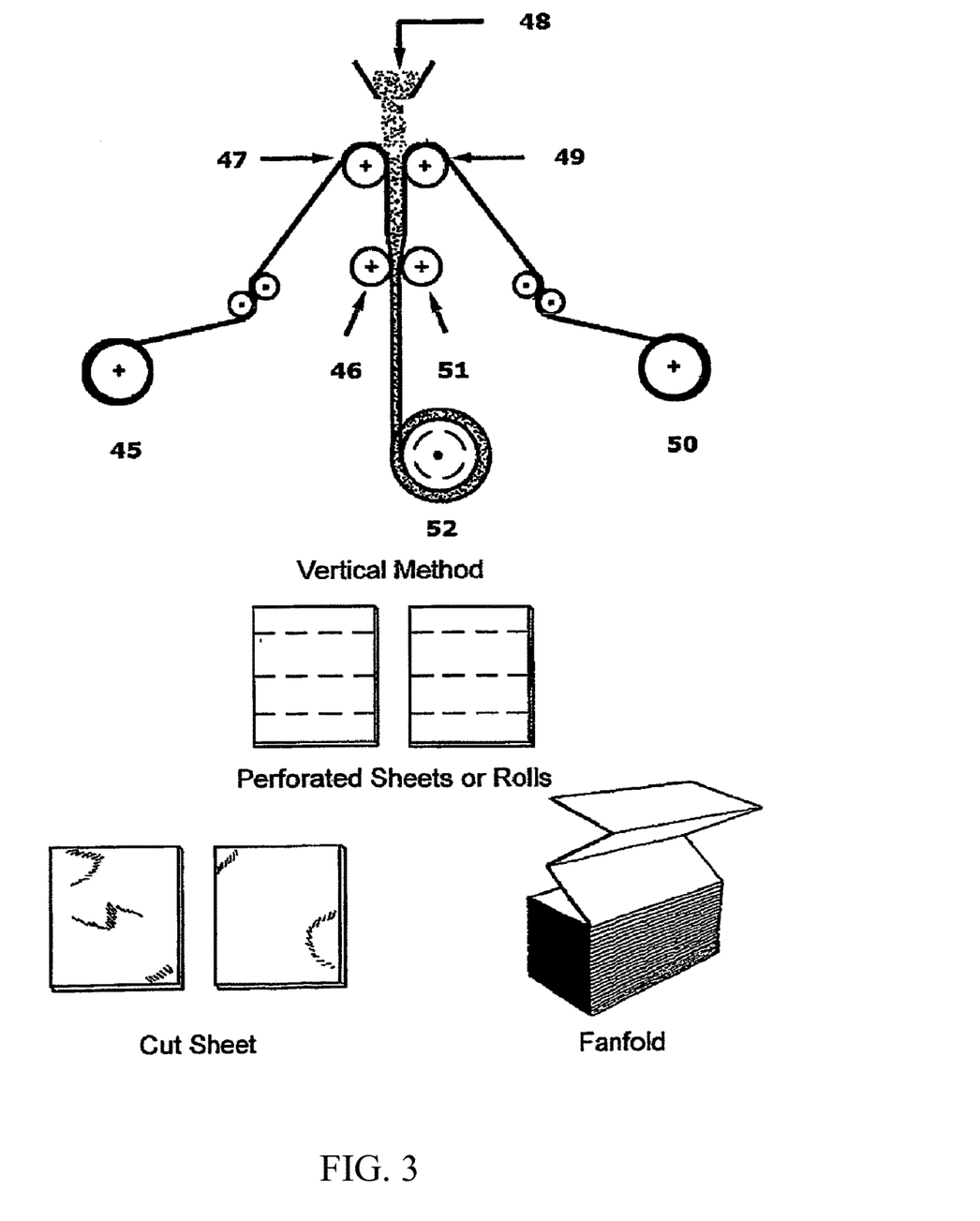
FIG. 3 schematically shows a vertical method for trapping dispensed material between water soluble films.
Figure 4:
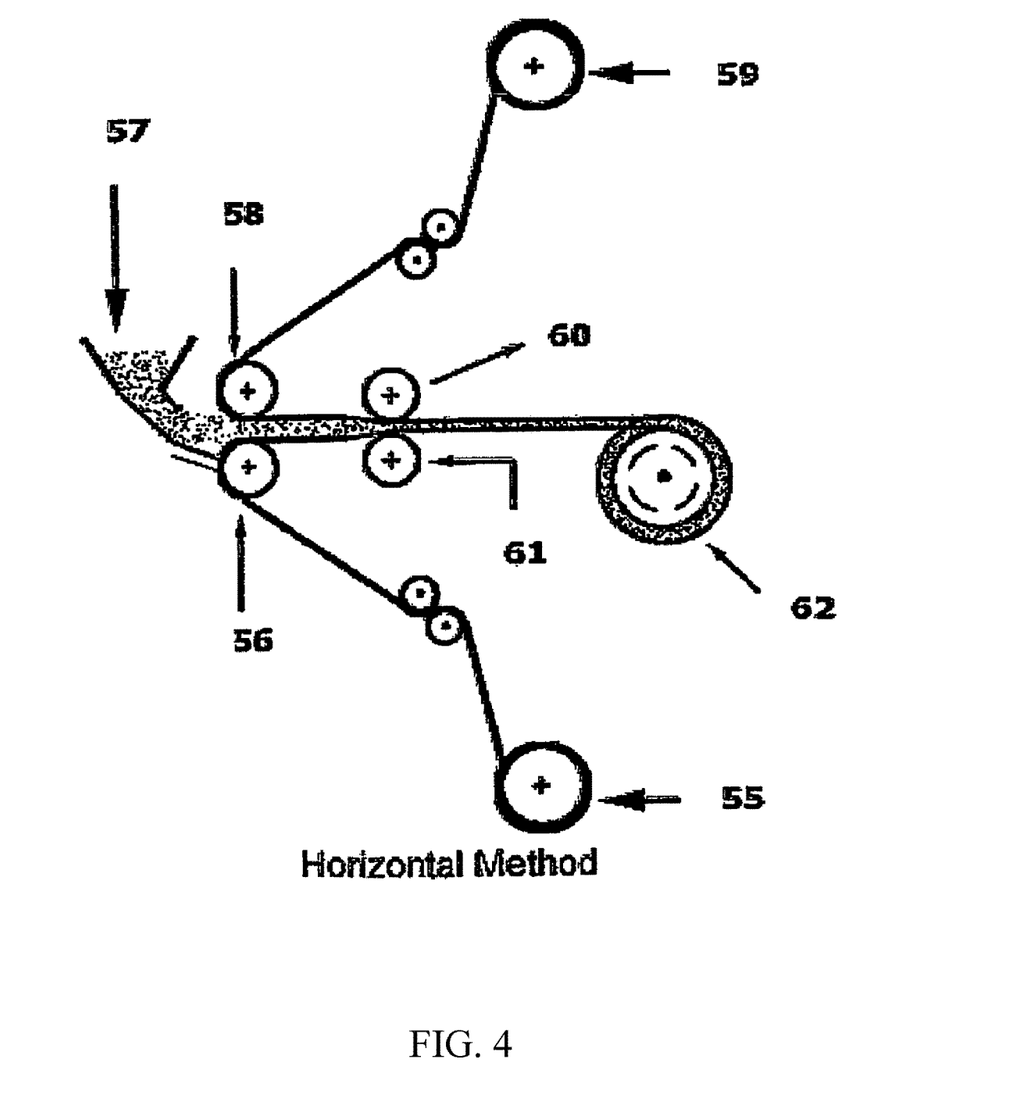
FIG. 4 schematically shows a horizontal method for trapping dispensed material between water soluble films.

The above sequence may be repeated in multiple layers as per the requirements of the end use of the multiply embedded WSFs. Further this process also allows the manufacture of multilayered embedded WSF using combinations of Cold WSFs and Hot WSFs in various sequences. It also provides the options of using cured/uncured films of CWSFs and HWSFs in any desired sequences Dimples or other embossed or patterned designs can be created during entrapment by using such designed male/female rollers (46, 51 Sheet No. 3) or rollers (60, 61 Sheet No. 4). In case of casting on liner method both the liners along with WSF film, semi-cured WSF and the entrapments may remain in roll form or sheet form in its original construction, stripping from casting liner can be done immediately or after an self curing aging period ranging from around 1 hr to around 720 hrs., prior to splitting the liners so as to deliver the final WSF film with entrapped materials.

Certain materials such as highly alkaline or highly acidic materials may react adversely if added in the batch mix process or if sprayed before the gelling process or before the film forming process and may therefore necessitate the use of entrapment method for incorporating such materials. Certain liquids like oil based perfumes, aromas, softening agents, cleaning agents etc or solvent based aromas, softening agents, cleaning agents etc may be entrapped more efficiently with entrapment method disclosed in this invention.

Offline Entrapment Method

The process to incorporate such sensitive materials described above comprises of the following:

Vertical Entrapment Method (FIG. 3).

The explanation to the part numbers in FIG. 3 is given below:

45 Unwinder; 46 Affixing Roller; 47 Guide Roll; 48 Disperser for Vertical Entrapment; 49 Guide Roll; 50 Unwinder; 51 Affixing Roller; 52 Rewinder;

1. Unwinding of the WSF films (45) and (50) with or without liner.
2. Dispensing of the embodiment at (48) in between two affixing guide rollers (47 & 49).
3. Affixing of the WSF films from step 2 at the affixing rollers (46 & 51).
4. Rewinding in roll form or sheet form or fan-fold form. Optionally the film can be with or without casting liners. The casting liners can be stripped immediately or after aging period of around 1 to around 720 hrs. or can be supplied all together and the end user may be informed to strip the casting liner before use. The entrapped film can also be slit in ribbons, tapes, perforated sheets, perforated tapes, perforated ribbons or cut sheets of any size.

Such a process offers various process and product options such as:

1. Entrapped material in WSF With or without carrier.
2. Entrapped material in WSF in Roll form or pouch form
3. Entrapped material in WSF in Roll form with perforates
4. Entrapped material in WSF in Sheet form with multiple pouches
5. All above Entrapped material in WSF with casting liner for the consumer to remove immediately or after aging period of around 1 hr to around 720 hrs.

Some of the product options the may be exercised are as follows:

H/E/H
H/E/C
H/E/H/E/H . . . n times
C/E/C/E . . . n times
C/E/C/E/C . . . n times
C/E/C . . . n times
L/UC/E/UH/E . . . n times
L/UH/E/UH/E . . . n times
L/UC/E/UC/E . . . n times
L/UC/E/H/L/E . . . n times
L/UH/E/H/L/E . . . n times
L/UC/E/C/L/E . . . n times
Where
U=Uncured; H=Hot Water Soluble Film; C=Cold Water Soluble Film
E=Embedded Material; L=Liner and the value of "n" is decided based on the application of the final multilayered embedded WSF.

The above sequence may be repeated in multiple layers as per the requirements of the end use of the multiply embedded WSFs. Further this process also allows the manufacture of multilayered embedded WSF using combinations of Cold WSFs and Hot WSFs in various sequences. It also provides the options of using cured/uncured films of CWSFs and HWSFs in any desired sequences Horizontal Entrapment Method (FIG. 4).

The explanation to the part numbers in FIG. 4 is given below:

55 Unwinder; 56 Guide Roll; 57 Disperser for Horizontal Entrapment; 58 Guide Roll; 59 Unwinder; 60 Affixing Roller; 61 Affixing Roller; 62 Rewinder; 63 Spillage Controller Knife;

1. Unwinding of the WSF films (59) and (55) with or without liner.
2. Dispensing of the embodiment at (57) in between two affixing guide rollers (58 & 56).
3. Affixing of the WSF films from step 2 at the affixing rollers (60 & 61).
4. Rewinding in roll form or sheet form or fan-fold form. Optionally the film can be with or without casting liners. The casting liners can be stripped immediately or after aging period of around 1 hr to around 720 hrs. or can be supplied all together and the end user may be informed to strip the casting liner before use. The entrapped film can also be slit in ribbons, tapes, perforated sheets, perforated tapes, perforated ribbons or cut sheets of any size.

Such a process offers various process and product options such as:

1. Embedded/entrapped material in WSF With or without carrier.
2. Embedded/Entrapped material in WSF in Roll form or pouch form
3. Embedded/Entrapped material in WSF in Roll form with perforates
4. Embedde/Entrapped material in WSF in Sheet form with multiple pouches
5. All above Embedded/Entrapped materials in WSF with casting liner for the end user to remove after aging period of around 1 hr to around 720 hrs.

In the above options the WSF film may be pre-embedded and used for the manufacture of the above product options.

In yet other embodiment of the invention, materials that are stable in hot water conditions may be introduced into Hot Water Soluble Films (HWSF) and those that are sensitive to cold conditions can be incorporated in Hot or Cold Water Soluble Films (CWSF).

Applications of the Process Options

The invention with various embodiments are now further illustrated with a few non-limiting Examples:

EXAMPLE I

Embedding of Actives such as Piian Liquid in WSF

Piian is a water dispersable deodorizer which is commercially available from Piian Systems, USA. Piian was added to the pre-mixed WSF formulation batch and stirred for 6 hours. This was followed by a period of another 6 hours with continuous slow stirring of the solution. The solution was then casted on a continuous casting line. It was then dried and spilt. Several samples of varying compositions were made to incorporate 10% Piian to 90% in WSFs.

The Grammage per Square Meter (GSM) for the Piian incorporated WSF measured as per IS1060 is represented as (A).

A reference WSF without the incorporation of Piian was prepared under identical conditions. The GSM of this reference sample is represented as (B). The Piian loaded in the WSF is therefore A−B=C.

Strips of 10×10 cms were cut from the material WSF loaded with Piian.

Following are the characteristics of the WSF strips loaded with Piian.:

Piian Loaded film=30.5 GSM (±½ Gm)
Loading of Piian=5 GSM
Film thickness of Piian loaded WSF=28 microns
GSM of the Reference film without Piian=26 gms. (±1 gm)

Following are test results of reference WSF and Piian loaded WSF

| Tensile Strength of the reference film | |
|---|---|
| $(kg/cm^2)$ Dir-I = 380.74 | Test Method - ASTM D-883 |
| Dir-II = 382.67 | Test Method - ASTM D-883 |
| Young Modulus | |
| $(kg/mm^2)$ Dir-I = 13.19 | Test Method - ASTM D-882 |
| Dir-II = 8.14 | Test Method - ASTM D-882 |
| Elongation (%) | |
| $(kg/cm^2)$ Dir-I = 259.27 | Test Method - ASTM D-882 |
| Dir-II = 252.90 | Test Method - ASTM D-882 |
| Puncture Resistance | |
| (Ozs. Inches/Tear Inch) = 270.00 | Test Method - IS-1060 |

| Tensile Strength of the Piian Load WSF | |
|---|---|
| $(kg/cm^2)$ Dir-I = 329.5 | Test Method - ASTM D-883 |
| Dir-II = 381.1 | Test Method - ASTM D-883 |
| Young Modulus | |
| $(kg/mm^2)$ Dir-I = 7.38 | Test Method - ASTM D-882 |
| Dir-II = 11.81 | Test Method - ASTM D-882 |
| Elongation (%) | |
| $(kg/cm^2)$ Dir-I = 252.36 | Test Method - ASTM D-882 |
| Dir-II = 291.50 | Test Method - ASTM D-882 |
| Puncture Resistance | |
| (Ozs. Inches/Tear Inch) = 225.00 | Test Method - IS-1060 |
| Dissolution in seconds = 86 secs at 30 C. | |
| Breaking of the film = 3.14 secs at 30 C. | |

The film properties of the Piian laoded WSF, together with the uniform dispersion of the Piian in the WSF illustrates that Piian can be delivered in precise quantities by incorporating it in the WSF using the process disclosed in the invention.

In one of the variants of the process described in this invention, pre-dissolved enzymes may be mixed in a WSF formulation and a controlled casting on a preformed substrate/liner based WSF film is possible. Alternatively two pre-formed substrate based WSF films may be used. A water-based enzyme may be loaded to precisely fill the center of the two films. The water based enzyme helps to affix the two films substrates so that the enzymes are sandwiched in between the films thereby resulting in an enzyme loaded WSF. The two substrates can then be stripped off after appropriate ageing.

Enzymes in precise quantities can be incorporated in singly or multi-layered WSFs by the process described in this invention so that the processor or the user does no inhalation of the enzyme. The enzyme embedded WSF can be incorporated into detergent formulations or added to washing medium in a machine or a washing vessel such as a bucket to ensure that the precise dosage of enzymes are added at the point of application.

EXAMPLE II

Incorporation of Large Particles in WSFs

Non-soluble Acrylic resins (72-75 microns) were dispersed into cold water-based solutions to form a high viscous dispersion. The liquid dispersion was dropped in between two films through a motorized valve controlled slot nozzle to have a margin at the end of the webs, thereby not allowing the dispersion to ooze out from the sides. Cold water was used as the solvent. Both the WSFs used were Hot Water Soluble formulations. In this process the Hot Water Soluble Films. Do not get affected by cold-water dispersion and therefore remain entrapped till the acrylic entrapped film passes through the dried and reaches the rewinder. Typically the film is split from its casting liner after an appropriate aging period.

The properties of the acrylic incorporated films were:
Acrylic Loaded GSM=60 GSM (±½ Gm)
Microns of Acrylic loaded film 140 microns
Base films GSM=58 GSM (±1 gm)
Weight of Acrylic Entrapping=2 GSM
Similarly following are test results of reference WSF and Acrylic resin loaded WSF

| Tensile Base film | |
|---|---|
| $(kg/cm^2)$ Dir-I = 380.74 | Test Method - ASTM D-883 |
| Dir-II = 382.67 | Test Method - ASTM D-883 |
| Young Modulus | |
| $(kg/mm^2)$ Dir-I = 13.19 | Test Method - ASTM D-882 |
| Dir-II = 8.14 | Test Method - ASTM D-882 |
| Elongation (%) | |
| $(kg/cm^2)$ Dir-I = 259.27 | Test Method - ASTM D-882 |
| Dir-II = 252.90 | Test Method - ASTM D-882 |
| Puncture Resistance | |
| (Ozs. Inches/Tear Inch) = 270.00 | Test Method - IS-1060 |

| Tensile Acrylic Entrapped film | |
|---|---|
| $(kg/cm^2)$ Dir-I = 80.69 | Test Method - ASTM D-883 |
| Dir-II = 83.46 | Test Method - ASTM D-883 |
| Young Modulus | |
| $(kg/mm^2)$ Dir-I = 2.79 | Test Method - ASTM D-882 |
| Dir-II = 3.25 | Test Method - ASTM D-882 |
| Elongation (%) | |
| $(kg/cm^2)$ Dir-I = 229.5 | Test Method - ASTM D-882 |
| Dir-II = 206.7 | Test Method - ASTM D-882 |
| Puncture Resistance | |
| (Ozs. Inches/Tear Inch) = 180.0 | Test Method - IS-1060 |
| Dissolution of film in seconds = 47 secs at 30 C. | |
| Breaking of the film = 3.75 secs at 30 C. | |

The WSF characteristic with the hydrophobic polymer indicates that the process disclosed in the invention can be effectively used to embed any hydrophobic materials of diverse shapes and sizes within a WSF matrix.

Also this application shows the possibility of using two hot water soluble films or a combination thereof, taking advantage of the hydrophilic properties. This application also shows the advantage of using casting liners.

EXAMPLE III

Films Incorporating Water Insoluble Fine Particles

The performance of the films based on water insoluble fine particles were prepared by the process described in this invention. Fine particle sized iron oxide (5-10 Microns) was dispersed in water based formulations to form a high viscous dispersion. The liquid dispersion thus obtained was precisely dropped in between two films through a motorized valve controlled slot nozzle in such a manner that a margin was available at the end of the webs, so as not to allow the dispersion to ooze out from the sides. In this case warm water at around 40° C. was used to deliver the dispersion to between two Cold WSF webs.

The properties of the ferric oxide incorporated films were:
GSM of Iron Oxide Loaded WSF=73 GSM (±½ Gm)
Thickness of Iron Oxide Loaded WSF=55 microns
GSM of reference WSF=58 GSM (±1 gm)
Weight of Iron Oxide Entrapping=15 GSM

| Tensile Strength of Entrapped film | |
|---|---|
| $(kg/cm^2)$ Dir-I = 325.87 | Test Method - ASTM D-883 |
| Dir-II = 327.77 | Test Method - ASTM D-883 |
| Young Modulus | |
| $(kg/mm^2)$ Dir-I = 7.18 | Test Method - ASTM D-882 |
| Dir-II = 8.26 | Test Method - ASTM D-882 |
| Elongation (%) | |
| $(kg/cm^2)$ Dir-I = 341.9 | Test Method - ASTM D-882 |
| Dir-II = 324.27 | Test Method - ASTM D-882 |
| Puncture Resistance | |
| (Ozs. Inches/Tear Inch) = 600 | Test Method - IS-1060 |
| Dissolution in seconds = 37 secs at 60 C. | |
| Breaking of the film = 19 secs at 60 C. | |

As illustrated in the earlier examples the material embedded films have favorable film properties and cab be used for diverse application. This application provides possibilities of embedding environmentally sensitive materials, wastes and toxic materials of diverse shapes, sizes and reactivities within an appropriate WSF Matrix in precise quantities for storage, transportation or disposal. This method may also be used to embed powdered or granular materials of any shapes or sizes such as pesticides, solid deodorants, disinfectants, uncoated enzymes, toxic products etc. which are to be delivered to their point of application/action or storage.

These applications also clearly demonstrate the wide number of product and process options using the methods disclosed in this invention.

The invention claimed is:

1. A process for the manufacture of a water soluble film with at least one embedded active material, the method comprising the steps of:
   i) taking up an elongate liner from a liner source;
   ii) providing a formulation for a water soluble film comprising at least one active material; the at least one active material being selected from the group consisting of detergents, enzymes, softeners, perfumes, pesticides, fungicides, active ingredients, dyes, pigments, hazardous chemicals, active agents for cleaning laundry, dishes, floorings, and walls, and combinations thereof;

iii) casting a solution of the formulation with said at least one active material from step (ii) on the elongate liner to form an elongate water soluble film on said elongate liner with said at least one active material physically incorporated in the water soluble film such that the active material is embedded in the water soluble film;

iv) drying the cast water soluble film with said at least one active material embedded and physically incorporated in said water soluble film on said elongate liner;

v) rewinding the liner on a collector either with or without the water soluble film adhered to the liner; and vi) casting a solution of a formulation for at least one further water soluble film on the embedded water soluble film from step (iv) at a subsequent casting head and drying the multi-layer water soluble film to produce a multi-layer water soluble substrate.

2. The process according to claim 1, wherein the liner is a polyester film liner.

3. The process according to claim 1, further comprising detaching the cast water soluble film from step (iv) from the liner of step (i).

4. The process of claim 3 including said step of detaching the cast water soluble film from the liner is performed before the step of rewinding the liner on the collector.

5. The process according to claim 1, further comprising providing at least one active material in the formulation for casting said at least one further water soluble film.

6. The process according to claim 1, wherein the multi-layer water soluble film comprises combinations of water soluble films which dissolve at different temperatures in any desired sequence.

7. The process according to claim 1, wherein raw materials for the water soluble film are selected from the group consisting of polyvinyl alcohol copolymer ionomers, polyvinyl alcohol homopolymer, non-ionomeric polyvinyl alcohol polymer, polymethacrylate, polyvinyl alcohol, polyacrylamide, polymethacrylamide, polyacrylic acid, and polymethacrylic acid.

8. The process according to claim 1, wherein raw materials for the water soluble film are selected from the group consisting of polyethyleneglycols, polyvinylpyrrolidone, proteinaceous binders, gelatine, modified gelatins, phthaloyl gelatine, polysaccharides, starch, gum Arabic and dextrin, water soluble cellulose derivatives, and combinations thereof.

9. The process of claim 1 wherein the active ingredient is an agrochemical.

10. A process for the manufacture of a multi-layer water soluble film with at least one embedded/entrapped active material, the method comprising the steps of:

i) taking up an elongate liner from a liner source;

ii) casting a solution of a first water soluble film formulation onto said elongate liner at a primary casting head;

iii) drying the cast first water soluble film on said liner;

(iv) casting a solution of a second water soluble film formulation on the first water soluble film from step (iii) at a secondary casting head to form a multi-layer water soluble film;

(v) drying the cast multi-layer water soluble film from step (iv);

wherein at least one of the first water soluble film formulation and the second water soluble film formation comprises the at least one active material such that the active material is embedded/entrapped such that it is physically incorporated in the cast water soluble film; the at least one active material being selected from the group consisting of detergents, enzymes, softeners, perfumes, pesticides, fungicides, active ingredients, dyes, pigments, hazardous chemicals, active agents for cleaning laundry, dishes, floorings, and walls, and combinations thereof; and vi) rewinding the liner on a collector either with or without the water soluble film adhered to the liner.

11. The process according to claim 10, further comprising repeating steps (iv) and (v) at subsequent casting heads.

12. The process according to claim 10, wherein raw materials for the water soluble film are selected from the group consisting of polyvinyl alcohol copolymer ionomers, polyvinyl alcohol homopolymer, non-ionomeric polyvinyl alcohol polymer, polymethacrylate, polyvinyl alcohol, polyacrylamide, polymethacrylamide, polyacrylic acid, and polymethacrylic acid.

13. The process according to claim 10, wherein raw materials for the water soluble film are selected from the group consisting of polyethyleneglycols, polyvinylpyrrolidone, proteinaceous binders, gelatine, modified gelatins, phthaloyl gelatine, polysaccharides, starch, gum Arabic and dextrin, water soluble cellulose derivatives, and combinations thereof.

14. The process of claim 10 wherein the active ingredient is an agrochemical.

15. A process for the manufacture of a multi-layer water soluble film with at least one entrapped active material, the method comprising the steps of:

i) providing a first water soluble film on a liner;

ii) providing a second water soluble film;

iii) bringing said first and second water soluble films proximate each other;

iv) depositing at least one active material between the first and second soluble films; the at least one active material being selected from the group consisting of detergents, enzymes, softeners, perfumes, pesticides, fungicides, active ingredients, dyes, pigments, hazardous chemicals, active agents for cleaning laundry, dishes, floorings, and walls, and combinations thereof; and v) affixing the first and second water soluble films together so that the at least one active material is entrapped between the first and second water soluble films.

16. The process according to claim 15, further comprising repeating steps (i) to (v) to entrap active material between successive water soluble films.

17. The process according to claim 15, wherein the entrapped active material helps to affix the two water soluble films to each other.

18. The process according to claim 15, wherein the entrapped active material is provided in selective areas of the water soluble film in desired shapes.

19. The process according to claim 15, wherein raw materials for the water soluble film are selected from the group consisting of polyvinyl alcohol copolymer ionomers, polyvinyl alcohol homopolymer, non-ionomeric polyvinyl alcohol polymer, polymethacrylate, polyvinyl alcohol, polyacrylamide, polymethacrylamide, polyacrylic acid, and polymethacrylic acid.

20. The process according to claim 15, wherein raw materials for the water soluble film are selected from the group consisting of polyethyleneglycols, polyvinylpyrrolidone, proteinaceous binders, gelatine, modified gelatins, phthaloyl gelatine, polysaccharides, starch, gum Arabic and dextrin, water soluble cellulose derivatives, and combinations thereof.

21. The process of claim 15 wherein the active ingredient is an agrochemical.

22. A process for the manufacture of water soluble film (WSF) with an embedded active material comprising:
  i) taking up an elongate liner from a liner source;
  ii) providing a WSF formulation;
  iii) using a solution of the WSF formulation to cast a WSF on said liner at a casting head;
  iv) metering the cast WSF at the casting head;
  v) providing at least one active material to be embedded in the cast WSF; the at least one active material being selected from the group consisting of detergents, enzymes, softeners, perfumes, pesticides, fungicides, active ingredients, dyes, pigments, hazardous chemicals, active agents for cleaning laundry, dishes, floorings, and walls, and combinations thereof;
  vi) dispensing the active material to be embedded in the WSF onto the cast WSF by a primary sprayer such that the active material is physically incorporated into the WSF;
  vii) smoothing the cast WSF with embedded active material physically incorporated therein;
  viii) drying the cast WSF on the liner with the active material embedded in the WSF; and
  ix) rewinding the liner on a collector either with or without the water soluble film adhered to the liner.

23. The process according to claim 22, wherein the liner material is a polyester film.

24. The process according to claim 22, further comprising:
  viii) unwinding a pre-formed WSF from an unwinder and guiding it through guide rolls to meet the cast WSF from step (vii) and entrapping further material between the pre-formed WSF and the cast WSF.

25. The process according to claim 24, wherein the entrapped material helps to affix the cast WSF and the pre-formed WSF to each other.

26. The process according to claim 22, wherein a raw material for the WSF formulation is selected from the group consisting of polyvinyl alcohol copolymer ionomers, polyvinyl alcohol homopolymer, non-ionomeric polyvinyl alcohol polymer, polymethacrylate, polyvinyl alcohol, polyacrylamide, polymethacrylamide, polyacrylic acid, and polymethacrylic acid.

27. The process according to claim 22, wherein a raw material for the WSF formulation is selected from the group consisting of polyethyleneglycols, polyvinylpyrrolidone, proteinaceous binders, gelatine, modified gelatins, phthaloyl gelatine, polysaccharides, starch, gum Arabic and dextrin, water soluble cellulose derivatives, and combinations thereof.

28. The process according to claim 22 wherein the said at least one active material is present in the WSF in an amount from about 3% to about 85%.

29. The process according to claim 22 wherein the said at least one active material is present in the WSF in an amount from about 4% to about 70%.

30. The process according to claim 22 wherein the said at least one active material is present in the WSF in an amount from about 5% to about 65%.

31. The process of claim 22 wherein the active ingredient is an agrochemical.

\* \* \* \* \*

UNITED STATES PATENT AND TRADEMARK OFFICE
CERTIFICATE OF CORRECTION

Page 1 of 2

PATENT NO. : 9,744,695 B2
APPLICATION NO. : 12/905035
DATED : August 29, 2017
INVENTOR(S) : Shilpan Pravinchandra Patel et al.

It is certified that error appears in the above-identified patent and that said Letters Patent is hereby corrected as shown below:

On the Title Page

Please replace the title page with the attached title page showing the corrected number of claims.

In the Claims

In Column 17, Lines 46 and 47; delete Claim 9.

In Column 18, Lines 25 and 26; delete Claim 14.

In Column 19, Lines 1 and 2; delete Claim 21.

In Column 20, Lines 29 and 30; delete Claim 31.

Please renumber remaining Claims 1-27 respectively.

Signed and Sealed this
Eighteenth Day of September, 2018

Andrei Iancu
*Director of the United States Patent and Trademark Office*

CERTIFICATE OF CORRECTION (continued)

(12) United States Patent
Patel et al.

(10) Patent No.: US 9,744,695 B2
(45) Date of Patent: Aug. 29, 2017

(54) METHOD OF MANUFACTURING EMBEDDED WATER SOLUBLE FILM CARRIER

(75) Inventors: Shilpan Pravinchandra Patel, Mumbai (IN); Atikullah Hussainmiya Saiyad, Gujurat (IN)

(73) Assignee: Arrow Greentech Limited, Guru Hargovindji Marg, Chakala, Andheri (E), Mumbai, Maharashtra (IN)

(*) Notice: Subject to any disclaimer, the term of this patent is extended or adjusted under 35 U.S.C. 154(b) by 0 days.

(21) Appl. No.: 12/905,035

(22) Filed: Oct. 14, 2010

(65) Prior Publication Data
US 2011/0039985 A1    Feb. 17, 2011

Related U.S. Application Data

(62) Division of application No. 10/491,951, filed as application No. PCT/IN02/00202 on Oct. 7, 2002, now abandoned.

(30) Foreign Application Priority Data

Oct. 9, 2001   (IN) ............................ 443/MUM/2001

(51) Int. Cl.
B29C 39/14    (2006.01)
B29C 39/20    (2006.01)
B29C 41/24    (2006.01)
C08J 5/18     (2006.01)
(Continued)

(52) U.S. Cl.
CPC ............ B29C 39/14 (2013.01); B29C 39/203 (2013.01); B29C 41/24 (2013.01); C08J 5/18 (2013.01);
(Continued)

(58) Field of Classification Search
CPC ........................................... B29C 41/28
See application file for complete search history.

(56) References Cited

U.S. PATENT DOCUMENTS 2,421,073 A * 5/1947 Kratz ............................ 425/218
2,436,433 A    2/1948 Jebens
(Continued)

FOREIGN PATENT DOCUMENTS

EP    0347220 A1    12/1989
EP    0716144 A2    6/1996
(Continued)

OTHER PUBLICATIONS

Kirk-Othmer, Encyclopedia of Chemical Technology, Fourth Edition, vol. 10, Explosives and Propellants to Flame Retardants for Textiles, pp. 761-787 (1993).

Primary Examiner — Benjamin Schiffman
(74) Attorney, Agent, or Firm — Polster, Lieder, Woodruff & Lucchesi, LC

(57) ABSTRACT

This invention relates to a water-soluble film (WSF) system with embedded/entrapped water-soluble films (WSF). More particularly, the invention relates to a WSF system with actives embedded/entrapped therein such as to provide precise and desired release of actives there from and its method of manufacturing for diverse applications, in which a variety of substances such as detergents, enzymes, softeners, perfumes, pesticides, fungicides, active ingredients, dyes, pigments, hazardous chemicals, active agents for cleaning laundry, dishes, floorings, walls, furniture, fluffs, pulp, etc., and the like can be so embedded/entrapped for such purpose. The invention further discloses novel online and offline process for the manufacture of such multi-layered WSF with or without liners and of desired shapes to selectively entrap interacting/non-interacting materials and their combinations. The process also provides options for the use of a wide range of raw materials, liners such as paper, film, foil, fabric, etc.

27 Claims, 4 Drawing Sheets